Patented May 27, 1930

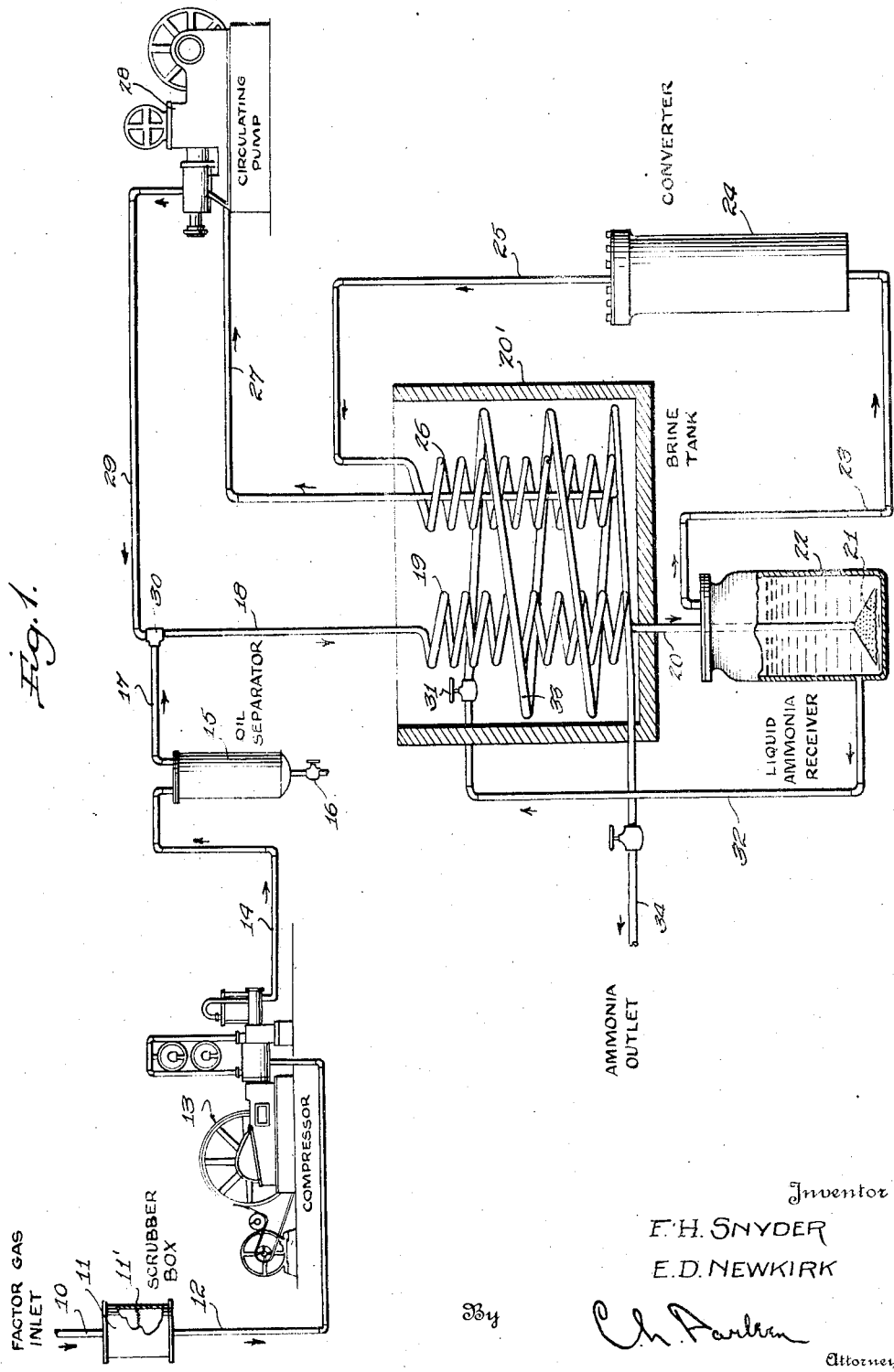

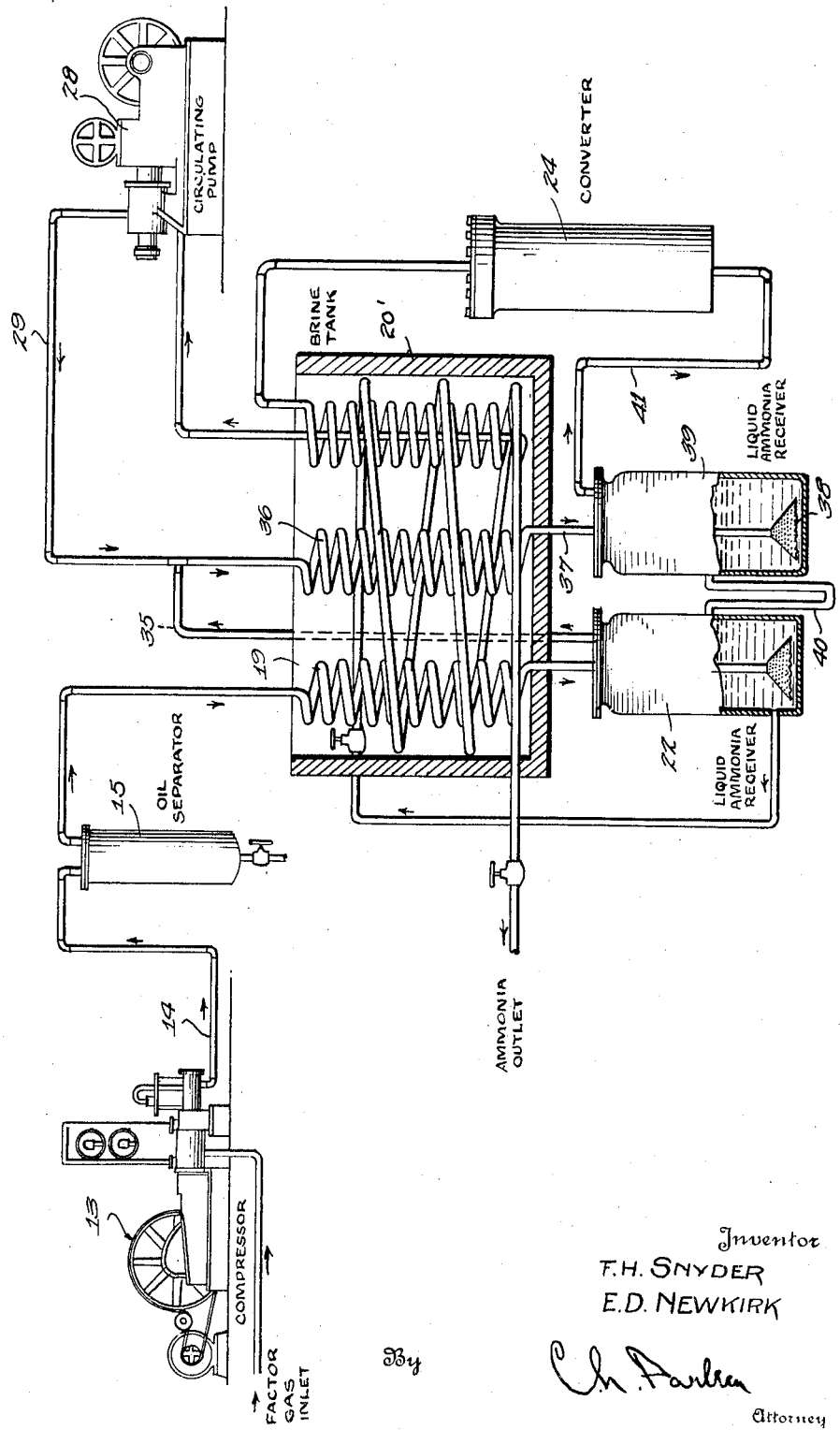

1,760,013

UNITED STATES PATENT OFFICE

FRANCIS H. SNYDER AND EDGAR D. NEWKIRK, OF SYRACUSE, NEW YORK

PROCESS OF AND APPARATUS FOR MAKING AMMONIA

Application filed February 21, 1927. Serial No. 170,025.

This invention relates generally to the fixation of nitrogen and more particularly to the manufacture of ammonia for industrial uses.

An important object of this invention is to provide a simple and commercially practical process for the manufacture of ammonia.

Another object of this invention is to provide a fixation process for the manufacture of ammonia at a cost which is substantially lower than the cost of ammonia as prepared by any of the fixation processes heretofore employed.

A further object of this invention is to provide a practical, economical and reliable process of producing ammonia by nitrogen fixation from hydrogen and nitrogen of a lesser degree of purity than heretofore could be successfully employed in the production of ammonia by fixation methods or to materially increase the life of the fixation catalyst over its life in prior processes if the nitrogen and hydrogen employed are of substantially the same degree of purity.

Another object of this invention is to provide a process of producing ammonia by nitrogen fixation wherein the catalyzer poisoning impurities in the factor gases are removed only temporarily while such gases are being contacted with the catalyzer in the ammonia converter such impurities being taken up by the ammonia produced and present in the final product.

Another object of the invention is to provide a process of producing synthetic ammonia wherein the factor gases are caused to contact with substantially all of the ammonia produced to absorb the catalyzer poisoning impurities from such factor gases and to retain such impurities.

A further object of this invention is to provide apparatus for efficiently carrying out our process.

Other objects and advantages of this invention will be apparent in the course of the following description.

In the accompanying drawing,

Figure 1 shows diagrammatically one form of apparatus particularly suitable for carrying out our process, and, Figure 2 shows diagrammatically a modified form of such apparatus.

In this showing, 10 designates a gas supply pipe which conducts a relatively or substantially pure hydrogen-nitrogen mixture from any suitable source (not shown) such as a gas purifying apparatus or a gasometer, to a deoxidizer 11. The deoxidizer 11 is preferably provided with a suitable catalyst, such for example, as a copper gauze screen 11' disposed transversely of the deoxidizing chamber, and such chamber is provided with means (not shown) for maintaining the deoxidizer at an elevated temperature. The function of the deoxidizer 11 is to remove any oxygen present in the hydrogen-nitrogen mixture by causing it to react with a portion of the hydrogen present to form water vapor. The deoxidizer is connected by means of a pipe 12 to a gas compressor 13 wherein the hydrogen-nitrogen mixture is compressed to about from 1000 to 10000 pounds per square inch, preferably about 4500 pounds per square inch, and forced through the pipe 14 into the oil separator 15. Any oil from the compressor 13 which is entrained by the hydrogen-nitrogen mixture passing therethrough is removed in the oil separator 15. The bulk of the water vapor present in small amounts in the hydrogen-nitrogen mixture is condensed out of the gases to a substantial extent during their compression in the compressor 13 and removed in the oil separator 15. The oil separator 15 is provided with a blow-off port or valve 16 preferably arranged near the bottom thereof.

The factor gases are conducted from the compressor 15 by the pipe 17 and the pipe 18 into a coil 19, arranged within a brine tank 20' which is maintained at a suitable low temperature preferably in a manner hereinafter described. The temperature of the factor gases in passing through the coil 19 is materially lowered and the gases are discharged through the pipe 20 and a bubble device or rose nozzle 21 into a body of liquefied ammonia gas which is maintained at a predetermined level in the separator 22. The function of the bubble device 21 is to cause the gases discharged therefrom to be broken up into very minute bubbles whereby they are brought into very intimate contact with the liquid ammonia in the separator 22.

After passing through the liquid ammonia the gases are discharged through the pipe 23 into an ammonia converter 24 which is of the usual construction and per se, forms no part of our invention. In the converter a certain proportion of the factor gases are united in the well known manner to form ammonia and such ammonia together with the uncombined factor gases are discharged through the pipe 25 into a coil 26 arranged in the brine tank 20' wherein the bulk of the ammonia formed in the converter 24 is condensed. The liquid ammonia and the uncombined factor gases are then discharged through the pipe 27 into a circulating pump 28 which is lubricated by means of the liquid ammonia passing therethrough. The liquid ammonia and the factor gases are then circulated by means of the pump 28 through the pipe 29, to the junction 30 where they are brought into contact with the new factor gases being introduced into the pipe 18 from the pipe 17. It will be apparent that the new factor gases introduced at the junction 30 will be in intimate contact with the liquid ammonia introduced from the pipe 29 throughout the passage of the factor gases through the pipe 18, the coil 19, and the pipe 20. When discharged through the bubble device 21 the liquid ammonia which previously had been formed in the converter 24 and condensed in the brine tank 20' will be collected in the separator 22.

The liquid ammonia in the separator 22 may be maintained at a predetermined level by any suitable means but we prefer to employ an expansion valve 31, which is arranged in the outlet pipe 32 of the separator 22. The expansion valve 31 is so adjusted as to permit the liquid from the separator to pass therethrough at a pressure and at a rate dependent upon such pressure, such that the liquid in the separator is maintained at the desired height. The expansion valve 31 is connected with a coil 33 arranged in the brine tank 20' and in the well known manner, the liquid ammonia discharged from the expansion valve 31 into the coil 33 materially lowers the temperature of the liquid in the brine tank. The coil 33 is provided with a discharge or outlet pipe 34 through which the ammonia is discharged from the system.

The modified form of apparatus shown in Figure 2 is similar to that shown in Figure 1, except in the following respects: The separator 22 is provided with an outlet pipe 35 which is connected to the pipe 29 in communication with the outlet from the pump 28, and also with a coil 36 in the brine tank 20' and through such coil, with the pipe 37 which terminates in a bubble device or rose nozzle 38. Factor gases from the separator 22 and ammonia from the pump 28 are discharged through the bubble device 38 into liquefied ammonia gas maintained at a predetermined level in separator 39 where the incoming gases are brought into intimate contact with the liquid ammonia in the separator 39. The level of the liquid ammonia in the separator 39 is maintained about the same as that of the ammonia in separator 22 by means of a connecting pipe 40 which preferably is bent into U-form as shown. The separator 39 is connected with the ammonia converter 24 by means of the pipe 41, as shown.

The modified form of construction shown in Figure 2 permits of the factor gases from the separator 22 being subjected to the further action of liquid ammonia in separator 39 before going to the converter 24 whereby a further purification of the factor gases is effected. The modified form of apparatus also provides means for subjecting the ammonia from the pump 28 to the action of the liquid ammonia in separator 39 without bringing it into contact with the factor gases from the oil separator 15 prior to the treatment of such gases in the separator 22.

In the practice of our process employing the form of apparatus illustrated in Figure 1, the hydrogen and nitrogen factor gases in the proper proportion for being united to form ammonia, and in substantially pure condition, are introduced from any suitable source through the pipe 10 into the synthesis apparatus. As heretofore stated, any oxygen present in the factor gases is removed by the deoxidizer 11 and the gases are compressed by the compressor 13 and forced through the oil separator 15 and the pipe 17 into the pipe 18. Liquid ammonia together with a certain amount of the factor gases uncombined in the converter 24 also are introduced into the pipe 18 at the junction 30 and the new factor gases together with such liquid ammonia and previously treated factor gases are conducted through the pipe 18, the coil 19 and the pipe 20 to the bubble device 21 from which the gases are discharged in the form of very minute bubbles which pass upwardly through the body of liquid ammonia in the separator 22. The ammonia which previously has been formed and condensed is separated out in the separator 22 and accumulates therein. The gases passing through the liquid ammonia in the separator 22 are subjected to the action of all of the liquid ammonia produced in the fixation apparatus and are practically completely freed from all water vapor and other impurities present. The gases after this treatment are then conducted through the pipe 23 to the converter 24 where in the manner heretofore described, a certain amount of the factor gases are united to form ammonia and such ammonia together with any uncombined factor gases are discharged through the pipe 25 into the coil 26 where the ammonia is liquefied in the manner heretofore described.

The proportion of the factor gases which are combined to form ammonia in the converter 24 will depend principally upon the temperature and pressure of the gases while under treatment in the converter, as well as upon the character of the particular catalyst employed in the converter. At atmospheric pressure even with the use of an efficient catalyst the yield of ammonia is very small. The yield increases with an increase of pressure or a decrease in temperature, or both. For example, using the Larson catalyst it is possible with a pressure of around 4500 pounds per square inch and a temperature of around 450° C. to obtain a yield in the converter of around 30 per cent of ammonia. It will be understood that the smaller the yield of ammonia in the converter the greater the necessity for continuing the circulation of the uncombined factor gases through the converter, the requirements of the process being to finally convert substantially all of the factor gases into ammonia in the converter by repeated action of the converter catalyst upon usch factor gases.

The gases and the liquid ammonia are discharged from the coil 26 through the pipe 27 into the circulating pump 28 by which they are circulated through the pipe 29 to the junction 30.

The liquid ammonia is maintained at a predetermined level in the separator 22 and is withdrawn as desired through the pipe 32 by regulating the expansion valve 31. The liquid ammonia is expanded into the coil 33 with the absorption of heat whereby the temperature of the liquid in the brine tank 20' is maintained at the desired low temperature and the ammonia is discharged from the apparatus through the pipe 34.

In the practice of our process employing the modified form of apparatus shown in Figure 2, the ammonia is produced in the manner above described except that the factor gases from the source of supply are not brought into contact with the liquid ammonia and uncombined factor gases from the converter 24 until such gases from the source of supply have been subjected to refrigeration in the coil 19 and to a preliminary treatment for the removal of impurities in the separator 22 and whereby the factor gases passing uncombined through the converter are brought into contact with the liquid ammonia in the separator 39 instead of passing through the liquid ammonia in the separator 22. It will be understood that, as the liquid ammonia in the separator 39 is not subjected to the contaminating action of the incoming factor gases but only to the action of the purified gases from the separator 22 and the converter 24, will remain in a very pure condition throughout the operation of the process. This is of importance as the life of the catalyst in the converter 24 is dependent upon the purity of the factor gases brought into contact therewith and by subjecting the gases prior to contact with such catalyzer to the action of practically uncontaminated liquid ammonia in the separator 39 the practically absolute purity of the factor gases coming into contact with the converter catalyst is assured.

The great importance of having the factor gases substantially wholly free from the catalyzer poisoning impurities will be understood from the fact that the cost of the production of ammonia by fixation methods depends very largely upon the purity of the factor gases which actually contact with the catalyzer in the converter. The presence of a small amount of impurities in the final product of our process is not of great commercial importance since the proportion of such impurities is too low to materially detrimentally affect its value for industrial purposes. It will be understood that the practically complete removal of impurities from the factor gases, even though such impurities are present in the final product, is of particular importance in producing ammonia at low cost.

In our process we take up, shunt or side track the catalyzer poisoning impurities in the factor gases in our system without eliminating or attempting to eliminate them from the product as has been done in prior processes, but we do, as we may say, so temporarily corral, handle or take care of such impurities that although not eliminated from our system they are practically completely removed from the factor gases at the time the latter are in contact with the catalyzer in the converter and this is what is essential in order to produce the ammonia at low cost.

Our process can be advantageously practiced with the advantageous results hereinbefore referred to in either of the forms of apparatus shown and described providing the hydrogen-nitrogen mixture carries only a minute quantity of catalyzer poisoning impurities. In treating gaseous mixtures containing a large proportion of impurities we prefer to employ the apparatus shown in Figure 2.

It will be understood that other means for cooling the coils 19 and 26 in the form of apparatus shown in Figure 1, or the coils 19, 26 and 36 in the modified form of apparatus shown in Figure 2, may be replaced by other refrigerating means without affecting the fundamental features of our invention although for economy and convenience we prefer to employ the particular form of apparatus herein shown and described.

It will be apparent from the foregoing description that in our process the catalyzer poisoning impurities in the hydrogen-nitrogen mixture employed are not eliminated from the system but are merely taken up and transferred from the factor gases to the final product. It also will be apparent that the incoming factor gases are subjected to the purifying action of substantially the entire bulk of the ammonia produced in the system so that the practically complete purification of such factor gases prior to contacting them with the converter catalyst is effected and ammonia produced at a very much lower cost than has been possible by prior methods.

While we have described in detail the preferred practice of our process and the preferred apparatus in which our process is carried out, it is to be understood that the details of procedure and details of construction of our apparatus may be widely varied without departing from the spirit of our invention or the scope of the subjoined claims.

We claim:

1. A process of making ammonia by the combination of hydrogen and nitrogen in the presence of a suitable catalyst which comprises subjecting the factor gases to the action of liquefied ammonia produced in the process to absorb and remove catalyzer poisoning impurities from such gases, effecting the reaction of the thus purified factor gases in the presence of the catalyst to form ammonia, cooling the ammonia formed and the remaining uncombined factor gases to an ammonia-liquefying temperature, mixing a stream of the thus liquefied ammonia and the cooled uncombined factor gases with a stream of additional incoming factor gases, contacting such mixture with a body of liquefied ammonia, and effecting the reaction of the thus purified factor gases to form ammonia.

2. A process of making ammonia by the combination of hydrogen and nitrogen in the presence of a suitable catalyst which comprises subjecting the factor gases to the action of liquefied ammonia produced in the process to absorb and remove catalyzer poisoning impurities from such gases, effecting the reaction of the thus purified factor gases in the presence of the catalyst to form ammonia, cooling the ammonia formed and the remaining uncombined factor gases to an ammonia-liquefying temperature, mixing a stream of the thus liquefied ammonia and the cooled uncombined factor gases with a stream of additional factor gases, cooling such resulting mixture to an ammonia liquefying temperature, contacting the thus cooled mixture with a body of liquefied ammonia, and effecting the reaction of the thus treated factor gases to form ammonia.

3. A process of making ammonia by the combination of hydrogen and nitrogen in the presence of a suitable catalyst which comprises subjecting the incoming factor gases to an ammonia-liquefying temperature, contacting the cooled gases with liquefied ammonia to absorb and remove catalyzer poisoning impurities from such gases, contacting and mixing the thus treated gases with a current of liquefied ammonia, introducing the resulting mixture into a body of liquefied ammonia and effecting the reaction of the thus purified factor gases in the presence of the catalyst to form ammonia.

4. In the continuous process of making ammonia by the combination of hydrogen and nitrogen in the presence of a suitable catalyst, the steps of successively contacting the ammonia factor gases with the catalyst, cooling the mixture of the ammonia formed and the uncombined factor gases to an ammonia-liquefying temperature, mixing a stream of additional incoming factor gases with a stream of the resulting liquefied ammonia and cooled uncombined factor gases, and introducing such final mixture into a body of liquefied ammonia.

5. In the continuous process of making ammonia by the combination of hydrogen and nitrogen in the presence of a suitable catalyst, the steps of contacting partially purified ammonia factor gases with a moving current of liquefied ammonia, introducing such mixture into a body of liquefied ammonia, and combining the purified factor gases in the presence of a suitable catalyst to form ammonia.

6. In the continuous process of making ammonia by the combination of hydrogen and nitrogen in the presence of a suitable catalyst, the steps of contacting partially purified ammonia factor gases with a moving current of liquefied ammonia, introducing such mixture into a body of liquefied ammonia, and repeatedly contacting the thus purified factor gases with a catalyst favorable to the combination of hydrogen and nitrogen to form ammonia and with a body of liquefied ammonia until substantially all of the factor gases have been combined.

7. In the continuous process of making ammonia by the combination of hydrogen and nitrogen in the presence of a suitable catalyst, the steps of successively contacting ammonia factor gases substantially free from catalyzer-poisoning impurities with a catalyst favorable to the combination of hydrogen and nitrogen to form ammonia, subjecting the ammonia formed and the remaining uncombined factor gases to an ammonia-liquefying temperature, mixing with a stream of the thus cooled mixture additional incoming factor gases, and contacting the resulting mixture with a body of liquefied ammonia.

8. In the continuous process of making ammonia by the combination of hydrogen and nitrogen in the presence of a suitable catalyst, the steps of successively contacting ammonia factor gases substantially free from catalyzer-poisoning impurities with a catalyst favorable to the combination of hydrogen and nitrogen to form ammonia, subjecting the ammonia formed and the remaining uncombined factor gases to an ammonia-liquefying temperature, mixing with the thus cooled mixture a stream of additional incoming factor gases, cooling the resulting mixture to an ammonia-liquefying temperature, and introducing the cooled mixture into a body of liquefied ammonia.

9. An apparatus for making ammonia comprising means for combining ammonia factor gases to form ammonia, means for supplying ammonia factor gases thereto, and means for cooling such factor gases, the ammonia formed, and any uncombined factor gases present, said cooling means comprising a tank, a body of liquid therein, a cooling coil arranged in said tank, condensing units arranged in said tank to cool said factor gases and to condense said ammonia formed, and means for expanding such liquid ammonia into said cooling coil to cool the liquid in said tank.

10. A process of making ammonia by the combination of hydrogen and nitrogen in the presence of a suitable catalyst which comprises mixing incoming factor gases with ammonia produced in the process, cooling the resulting mixture by expansion of liquefied ammonia produced in the process to an ammonia liquefying temperature, contacting the thus cooled mixture with liquefied ammonia produced in the process to remove catalyzer poisoning impurities from said gases, and effecting the reaction of the thus purified factor gases to form ammonia.

11. A process of making ammonia according to claim 10 wherein the ammonia formed by the reaction of the purified factor gases is cooled to an ammonia liquefying temperature by expansion of liquefied ammonia produced in the process, prior to mixing the incoming factor gases therewith.

In testimony whereof we affix our signatures.

FRANCIS H. SNYDER.
EDGAR D. NEWKIRK.